US010676868B2

(12) United States Patent
Heiskanen et al.

(10) Patent No.: US 10,676,868 B2
(45) Date of Patent: Jun. 9, 2020

(54) METHOD FOR PRODUCING A FILM HAVING GOOD BARRIER PROPERTIES

(71) Applicant: Stora Enso OYJ, Helsinki (FI)

(72) Inventors: Isto Heiskanen, Imatra (FI); Kaj Backfolk, Lappeenranta (FI); Esa Saukkonen, Lappeenranta (FI); Nina Ruohoniemi, Imatra (FI); Katja Lyytikainen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 163 days.

(21) Appl. No.: 15/759,089

(22) PCT Filed: Sep. 16, 2016

(86) PCT No.: PCT/IB2016/055532
§ 371 (c)(1),
(2) Date: Mar. 9, 2018

(87) PCT Pub. No.: WO2017/046755
PCT Pub. Date: Mar. 23, 2017

(65) Prior Publication Data
US 2019/0048527 A1    Feb. 14, 2019

(30) Foreign Application Priority Data
Sep. 17, 2015    (SE) ...................... 1551194

(51) Int. Cl.
| | | |
|---|---|---|
| *D21H 11/18* | (2006.01) | |
| *D21H 21/20* | (2006.01) | |
| *B29D 7/01* | (2006.01) | |
| *C08J 5/18* | (2006.01) | |
| *D21C 9/00* | (2006.01) | |
| *D21H 11/20* | (2006.01) | |

(52) U.S. Cl.
CPC .............. *D21H 11/18* (2013.01); *B29D 7/01* (2013.01); *C08J 5/18* (2013.01); *D21C 9/007* (2013.01); *D21H 11/20* (2013.01); *D21H 21/20* (2013.01); *C08J 2301/00* (2013.01)

(58) Field of Classification Search
CPC ........ D21H 11/18; D21H 11/20; D21H 21/14; D21H 21/18; D21H 21/20; D21H 15/02; D21H 19/34; D21F 1/0009; C08J 5/18; C08J 2301/02; B29D 7/01; C08L 1/02; C09D 7/67; C09D 101/02; D21C 9/002; D21C 9/005; D21C 9/007; D21D 1/20; D21D 99/00
USPC .............................. 162/146, 157.6
See application file for complete search history.

(56) References Cited

U.S. PATENT DOCUMENTS

| | | | |
|---|---|---|---|
| 8,658,287 B2 | 2/2014 | Berglund et al. | |
| 2011/0281487 A1* | 11/2011 | Mukai ................ | B32B 5/02 |
| | | | 442/335 |

FOREIGN PATENT DOCUMENTS

| | | |
|---|---|---|
| EP | 2371892 | 10/2011 |
| WO | 2014091212 A1 | 6/2014 |
| WO | 2014091413 A1 | 6/2014 |

OTHER PUBLICATIONS

International Search Report for PCT/IB2016/055532, dated Nov. 29, 2016.
Jun Hosokawa et al: "Biodegradable film derived from chitosan and homogenized cellulose", Industrial & Engineering Chemistry Research., vol. 29, No. 5, May 1, 1990, pp. 800-805.
Christian Aulin et al: "Transparent Nanocellulosic Multilayer Thin Films on Polylactic Acid with Tunable Gas Barrier Properties", ACS Applied Materials and Interfaces, vol. 5, No. 15, Jul. 8, 2013, pp. 7352-7359.
Jielong Su et al: "Effect of tethered and free microfibrillated cellulose (MFC) on the properties of paper composites", Cellulose, vol. 20, No. 4, May 28, 2013, pp. 1925-1935.
Kristin Syverud and Per Stenius: "Strength and barrier properties of MFC films", Cellulose, Springer Netherlands, Netherlands, vol. 16, No. 1, Aug. 19, 2008, pp. 75-85.
Nathalie Lavoine et al: "Impact of different coating processes of microfibrillated cellulose on the mechanical and barrier properties of paper", Journal of Materials Science, vol. 49, No. 7, Jan. 14, 2014, pp. 2879-2893.

* cited by examiner

*Primary Examiner* — Eric Hug
(74) *Attorney, Agent, or Firm* — Greer, Burns & Crain, Ltd.

(57) ABSTRACT

The present invention relates to a method for manufacturing a film having an oxygen transmission rate in the range of from 1 cc/m$^2$/24 h to 500 cc/m$^2$/24 h according to ASTM D-3985, at a relative humidity of more than 50% at 25° C., or higher than 75% at 25° C., or higher than 85% at 25° C., wherein the method comprises the steps of: providing a first suspension comprising a microfibrillated cellulose, wherein the dry content of the suspension is in the range of from 0.1 to 10% by weight, adding a wet strength additive to said first suspension, at an amount of from 0.1 to 10 weight-% based on the amount of microfibrillated cellulose (dry/dry), thereby forming a mixture of the microfibrillated cellulose and the wet strength additive, applying said mixture to a substrate to form a fibrous web and drying said web to form said film. The present invention also relates to a film produced according to the method.

10 Claims, No Drawings

METHOD FOR PRODUCING A FILM HAVING GOOD BARRIER PROPERTIES

This application is a U.S. National Stage under 35 U.S.C. § 371 of International Application No. PCT/IB2016/055532, filed Sep. 16, 2016, which claims priority to Swedish Patent application no. 1551194-2, filed Sep. 17, 2015.

TECHNICAL FIELD

The present document relates to a barrier film having a good and stable oxygen transmission rate (OTR) at high relative humidity's (RH). More particularly, the present disclosure relates to a method of manufacturing such a film.

BACKGROUND

Today, films comprising microfibrillated cellulose (MFC), have proven to give excellent barrier properties (see e.g. Aulin et al., Oxygen and oil barrier properties of microfibrillated cellulose films and coatings, Cellulose (2010) 17:559-574, Lavoine et al., Microfibrillated cellulose—Its barrier properties and applications in cellulosic materials: A review, Carbohydrate polymers 90 (2012) 735-764, Kumar et al., Comparison of nano- and microfibrillated cellulose films, Cellulose (2014) 21:3443-3456), whereas the gas barrier properties are very dependent on the moisture or the relative humidity in the surrounding environment. Therefore, it is quite common that MFC films have to be coated with a polymer film to prevent moisture or water vapor to swell and disrupt the MFC film.

The lack of gas barrier properties such as oxygen or air, at high relative humidity has been investigated and described although most of these solutions are expensive and difficult to implement in industrial environment. One route is to modify the MFC or nanocellulose such as disclosed in JP2554589A1 where MFC dispersion was modified with silane coupling agent. The EP2551104A1 teaches the use of MFC and polyvinyl alcohol (PVOH) and/or polyuronic acid with improved barrier properties at higher relative humidity (RH). Another solution is to coat the film with a film that has high water fastness and/or low water vapor transmission rate. The JP2000303386A discloses e.g. latex coated on MFC film, while US2012094047A teaches the use of wood hydrolysates mixed with polysaccharides such as MFC that can be coated with a polyolefin layer. In addition to this chemical modification, the possibility of cross-linking fibrils or fibrils and copolymers has been investigated. This improves water fastness of the films but also water vapor transmission rates. EP2371892A1, EP2371893A1, claims cross-linking MFC with metal ions, glyoxal, glutaraldehyde and/or citric acid, respectively.

However, many of the above solutions require either a post-treatment step or high dosages in order to be effective. Many of the disclosed solutions also limit the production of a MFC film and particularly re-pulping of the same.

There is thus a need to find a simpler solution of producing such films, preferably something that could be used on a paper or paperboard machine, or modified versions thereof, where a subsequent coating or impregnation step can be avoided, since the number of coating stations usually is limited on a paper machine.

SUMMARY

It is an object of the present disclosure, to provide an improved film comprising microfibrillated cellulose, which has improved barrier properties even at higher relative humidity in the surroundings.

The invention is defined by the appended independent claims. Embodiments are set forth in the appended dependent claims and in the following description and drawings.

According to a first aspect, there is provided a method for manufacturing a film having an oxygen transmission rate in the range of from 1 $cc/m^2/24$ h to 500 $cc/m^2/24$ h, at a relative humidity of more than 50% at 25° C., or higher than 75% at 25° C., or higher than 85% at 25° C., wherein the method comprises the steps of: providing a first suspension comprising a microfibrillated cellulose, wherein the dry content of the suspension is in the range of from 0.1 to 10% by weight, adding a wet strength additive to said first suspension, at an amount of from 0.1 to 10 weight-% based on the amount microfibrillated cellulose (dry/dry), thereby forming a mixture of the microfibrillated cellulose and the wet strength additive and applying said mixture to a substrate to form a fibrous web and drying said web to form said film.

It has surprisingly been found that it is possible to add wet strength additive in a relative low amount when making barrier films to achieve a stable oxygen transmission rate of the film even at high relative humidity values. Conventionally a wet strength additive is used in a paper just to increase the wet strength. This method provides for the manufacture of a film having a good oxygen transmission rate (OTR) at a high relative humidity level. Most important, the additive will not affect the ability of the microfibrillated cellulose film to create low OTR values, i.e. being a good barrier film.

According to one embodiment the substrate to which the mixture is applied may be a porous wire on which the mixture forms a web. It is thus possible to apply the method in the wet end of a paper machine.

Through this method a freestanding film can be manufactured by applying a suspension comprising MFC and wet strength additive in the wet end of a paper making machine. In this way a film having excellent barrier properties may be formed. The film may subsequently be applied as a barrier layer on a paper or paper board.

According to one embodiment the substrate to which the mixture is applied may also be a paper or paper board in a paper making process, thus forming a film coating on said paper or paper board.

By this method it is possible to directly apply the mixture to a paper or paperboard to achieve the barrier film on a paper or paper board in an easy manner.

According to one alternative embodiment the method may further comprise the step of applying said mixture to the substrate in a surface sizing step in a paper or paperboard making process.

The method may, according to one embodiment, further comprise a step of curing the formed film. The curing, i.e. drying, may be performed by heat, air, radiation or contact drying etc.

According to one embodiment the method may comprise the step of co-mixing and fibrillating said microfibrillated cellulose in the presence of said wet strength resin. This may provide for even better barrier properties of the film.

According to one embodiment of the first aspect the microfibrillated cellulose may have a Schopper Riegler value (SR°) of more than 90 SR°, or more than 93 SR°, or more than 95 SR°.

The wet strength additive may be a wet strength resin, and may comprise any one of polyaminopolyamide-epichlorohydrin (PAE), melamine resins, urea formaldehyde resins, polyethylenepolyamino ammonia epichlorohydrin (PAE or PPE), polyethyleneimine, chitosan, maleic anhydride-acylated chitosan (MAAC), dialdehyde starch (DAS), or combinations and mixtures thereof.

Preferably the wet strength additive or resin is such that it provides a long term wet strength.

According to one embodiment of the first aspect the first suspension may further comprise any one of a starch, carboxymethyl cellulose, a filler, retention chemicals, flocculation additives, deflocculating additives, dry strength additives, softeners, or mixtures thereof.

According to a second aspect there is provided a film obtained by the method according to the first aspect which film comprises microfibrillated cellulose and a wet strength agent, wherein the film has an oxygen transmission rate in the range of from 1 $cc/m^2/24$ h to 500 $cc/m^2/24$ h measured according to the standard ASTM D-3985, at a relative humidity of more than 50% at 25° C., and wherein the film comprises a mixture of a microfibrillated cellulose and a wet strength resin.

According to one embodiment of the second aspect the film may have a basis weight of less than 50 $g/m^2$, or less than 35 $g/m^2$, or less than 25 $g/m^2$.

The said film may be any one of a free-standing film and a film coating on a paper or paper board.

DESCRIPTION OF EMBODIMENTS

According to the inventive method a first suspension comprising a microfibrillated cellulose is provided and mixed with a wet strength additive to form mixture comprising the microfibrillated cellulose and the wet strength additive.

The mixture may then be applied onto a substrate to form a fibrous web.

The support may be a porous wire of a paper making machine, i.e. any kind of paper making machine known to a person skilled in the art used for making paper, paperboard, tissue or any similar products.

According to one alternative embodiment the mixture of the microfibrillated cellulose and the wet strength additive may be applied as a coating to a paper or paper board in a paper making process. The mixture thereby forms a film coating on said paper or paper board, having the desired barrier properties.

According to another embodiment the mixture may be applied to the substrate in a surface sizing step in a paper or paperboard making process. The mixture may be applied as a conventional surface sizing liquid or as a foam. By surface sizing is meant conventional contact coating methods used in paper and paperboard industry. Those are e.g. film press, surface sizing (pound or flooded nip size press), gate roll, Gate roll Inverted coater, Twin HSM applicator, Liquid application system, blade/roll metering with the Bill blade, TwoStream, Blade/Blade metering with the mirrorBlade, VACPLY, or application and metering with a nozzle unit onto paper web (Chapt. 14, Coating and surface sizing technologies, Linnonmaa, J., and Trefz, M., in Pigment coating and surface sizing of paper, Papermaking Science and Technology, Book 11, $2^{nd}$ Ed., 2009). In addition, reverse gravure or gravure methods, sizing based on indirect metering onto roll using e.g. spray, spinning or foam deposition may also be included in this definition. Other variations and modifications or combinations of the coating methods, obvious for a person skilled in the art, are also included herein.

According to one embodiment this web can then subsequently be dried to form a film.

According to one embodiment the film, comprising the microfibrillated cellulose and a wet strength additive, has an oxygen transmission rate in the range of from 1 $cc/m^2/24$ h to 500 $cc/m^2/24$ h measured according to the standard ASTM D-3985, at a relative humidity of more than 50% at 25° C. According to one alternative embodiment the film, comprising the microfibrillated cellulose and a wet strength additive, has an oxygen transmission rate in the range of from 1 $cc/m^2/24$ h to 500 $cc/m^2/24$ h measured according to ASTM D-3985, at a relative humidity of more than 75% at 25° C. According to yet an alternative embodiment the film, comprising the microfibrillated cellulose and a wet strength additive, has an oxygen transmission rate in the range of from 1 $cc/m^2/24$ h to 500 $cc/m^2/24$ h measured according to ASTM D-3985, at a relative humidity of more than 85% at 25° C.

The amount of microfibrillated cellulose in the first suspension and in the produced film may, according to one embodiment be in the range of from 60 to 99.9 weight-% based on total dry solid content. According to an alternative embodiment the amount of MFC may be in the range of 70 to 95 weight-% based on total dry solid content, or in the range of from 75 to 90 weight-% based on total dry solid content.

According to one embodiment the film may have a basis weight of less than 50 $g/m^2$, or less than 35 $g/m^2$, or less than 25 $g/m^2$.

According to one embodiment the film formed may be calendered. The final density, film properties and moisture content may thus be adjusted in the calender. Known techniques such as hard-nip, soft-nip, soft-hard nip, cylinder or belt, in various forms and combinations can be used.

According to one embodiment the film may be cured, i.e. dried. The curing may be performed by any conventional technique known to the skilled person, such as by heat, air, radiation or contact drying etc.

According to one embodiment the MFC may have a Schopper Riegler value (SR°) of more than 90. According to another embodiment the MFC may have a Schopper Riegler value (SR°) of more than 93. According to yet another embodiment the MFC may have a Schopper Riegler value (SR°) of more than 95. The Schopper-Riegler value can be obtained through the standard method defined in EN ISO 5267-1. This high SR value is determined for a repulped wet web, with or without additional chemicals, thus the fibers have not consolidated into a film or started e.g. hornification.

The dry solid content of this kind of web, before disintegrated and measuring SR, is less than 50% (w/w). To determine the Schopper Riegler value it is preferable to take a sample just after the wire section where the wet web consistency is relatively low.

The skilled person understands that paper making chemicals, such as retention agents or dewatering agents, have an impact on the SR value.

The SR value specified herein, is to be understood as an indication but not a limitation, to reflect the characteristics of the MFC material itself. However, the sampling point of MFC might also influence the measured SR value. For example, the furnish could be either a fractionated or unfractionated suspension and these might have different SR values. Therefore, the specified SR values given herein, are thus either a mixture of coarse and fine fractions, or a single fraction comprising an MFC grade providing the desired SR value.

Microfibrillated cellulose (MFC) shall in the context of the patent application mean a nano scale cellulose particle fiber or fibril with at least one dimension less than 100 nm.

MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 200 m2/g, or more preferably 50-200 m2/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to hydrolyse or swell fiber or reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

In one embodiment of the present invention, the microfibrillated cellulose is fibrillated in the presence of the wet strength additive. This means that the wet strength additive is either added before the fibrillation process or during the fibrillation process.

According to one embodiment the dry content of the first suspension comprising the microfibrillated cellulose may be in the range of from 0.1 to 10% by weight.

The wet strength additive may be added to said first suspension, at an amount of from 0.1 to 10 weight-% based on the amount MFC (dry/dry). Too high amount of wet strength agent will increase the OTR value of the produced film.

According to one embodiment the said wet strength additive is a wet strength additive or a wet strength resin which provides for a long term wet strength in the web or film.

The wet strength resin may be any one of polyaminopolyamide-epichlorohydrin (PAE), melamine resins, urea formaldehyde resins, polyethylenepolyamino ammonia epichlorohydrin (PAE or PPE), polyethyleneimine, chitosan, maleic anhydride-acylated chitosan (MAAC), dialdehyde starch (DAS), or combinations and mixtures thereof.

The first suspension may further comprise other additives to provide different characteristics to the film. Those additives, may be any one of a starch, carboxymethyl cellulose, a filler, retention chemicals, flocculation additives, deflocculating additives, dry strength additives, softeners, or mixtures thereof, but may also be other types of additives suitable for the particular application of the film.

According to one embodiment the additives are selected such that the film is biodegradable after a certain time.

EXAMPLE

The Oxygen Transmission Rate (cc/m$^2$/24 h) for 20 gsm films prepared from coarse MFC and fine MFC (3× fluidized) with various amounts of added PAE wet strength resin was measured according to ASTM D-3985.

TABLE 1

Tests with relatively coarse MFC -C
(low viscosity, homogenized fibers)

|  | OTR value (50% RH) | OTR value (85% RH) |
|---|---|---|
| MFC-C | 190 | 455 |
| MFC-C + 5 kg/t PAE | 5.5 | 288 |
| MFC-C + 15 kg/t PAE | 250 | 480 |
| MFC-C + 50 kg/t PAE | 6988 | 6919 |

TABLE 2

| | OTR value (85% RH) |
|---|---|
| MFC-F | 1657 |
| MFC-F + 5 kg/t PAE | 431 |
| MFC-F + 15 kg/t PAE | 1144 |
| MFC-F + 50 kg/t PAE | 4046 |

Tests with fine MFC-F (high viscosity, pre-treated fibers 3 × fluidized)

Thus, it is clear from these tests that the addition of low amounts of wet strength agents clearly decreases the OTR value for the MFC film, thus it creates a good oxygen barrier.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for manufacturing a film having an oxygen transmission rate in the range of from 1 cc/m²/24 h to 500 cc/m²/24 h according to ASTM D-3985, at a relative humidity of more than 50% at 25° C., wherein the method comprises the steps of:
   providing a first suspension comprising a microfibrillated cellulose, wherein the dry content of the suspension is in the range of from 0.1 to 10% by weight,
   adding a wet strength additive to said first suspension, at an amount of from 0.1 to 10 weight-% based on the amount of microfibrillated cellulose (dry/dry),
   co-mixing and fibrillating said microfibrillated cellulose in the presence of said wet strength additive,
   applying said mixture to a support to form a fibrous web and
   drying said web to form said film.

2. The method according to claim 1 wherein said support is a porous wire in a paper making machine to which the mixture is applied to form the fibrous web.

3. The method according to claim 1 wherein the support is a paper or paperboard to which the mixture if applied to form a film coating on said paper or paper board.

4. The method as claimed in claim 1, wherein said support is a substrate and said method further comprises the step of applying said mixture to the substrate in a surface sizing step in a paper or paperboard making process.

5. The method as claimed in claim 1, wherein the method further comprises a step of curing the formed film.

6. The method according to claim 1 wherein the microfibrillated cellulose has a Schopper Riegler value (SR°) of more than 90 SR°.

7. The method as claimed in claim 1, wherein said wet strength additive is a wet strength resin, selected from the group of polyaminopolyamide-epichlorohydrin (PAE), melamine resins, urea formaldehyde resins, polyethylenepolyamino ammonia epichlorohydrin (PAE or PPE), polyethyleneimine, chitosan, maleic anhydride-acylated chitosan (MAAC), dialdehyde starch (DAS), or combinations and mixtures thereof.

8. The method as claimed in claim 1, wherein said first suspension further comprises a starch selected from the group of carboxymethyl cellulose, a filler, retention chemicals, flocculation additives, deflocculating additives, dry strength additives, softeners, or mixtures thereof.

9. The method according to claim 1 wherein the microfibrillated cellulose has a Schopper Riegler value (SR°) of more than 93 SR°.

10. The method according to claim 1 wherein the microfibrillated cellulose has a Schopper Riegler value (SR°) of more than 95 SR°.

* * * * *